C. CRETORS.
GRADER FOR POPCORN APPARATUS.
APPLICATION FILED NOV. 10, 1917.

1,279,518.

Patented Sept. 24, 1918.
3 SHEETS—SHEET 2.

Witness:
John Enders

Inventor:
Charles Cretors,
by
Robert Burns
Atty.

C. CRETORS.
GRADER FOR POPCORN APPARATUS.
APPLICATION FILED NOV. 10, 1917.

1,279,518.

Patented Sept. 24, 1918.
3 SHEETS—SHEET 3.

Witness:
John Enders

Inventor:
Charles Cretors,
by Robert Burns
Atty.

UNITED STATES PATENT OFFICE.

CHARLES CRETORS, OF CHICAGO, ILLINOIS.

GRADER FOR POPCORN APPARATUS.

1,279,518.   Specification of Letters Patent.   Patented Sept. 24, 1918.

Application filed November 10, 1917. Serial No. 201,194.

*To all whom it may concern:*

Be it known that I, CHARLES CRETORS, a citizen of the United States of America, and a resident of Chicago, in the county of Cook, State of Illinois, have invented certain new and useful Improvements in Graders for Popcorn Apparatus, of which the following is a specification.

This invention relates to that class of continuously operating corn popping apparatus which forms the subject matter of my prior Letters Patent No. 1,201,807, dated October 17, 1916, and of my prior application for Letters Patent, Serial No. 158,930, filed March 31st, 1917, and has for its object:

To provide in connection with the automatically operating corn popping means of such apparatus, a simple and efficient grading means adapted to receive the contents of the popping pan and grade and separate the perfectly popped corn from the unpopped corn, burnt grains and finer particles, in an effective and continuous manner, and which is capable of adjustment to attain varied degrees of the grading operation as found most desirable with the grade, etc., of the particular batch of corn which is being treated, all as will hereinafter more fully appear.

In the accompanying drawings:—

Like reference numerals indicate like parts in the several views.

Figure 1:
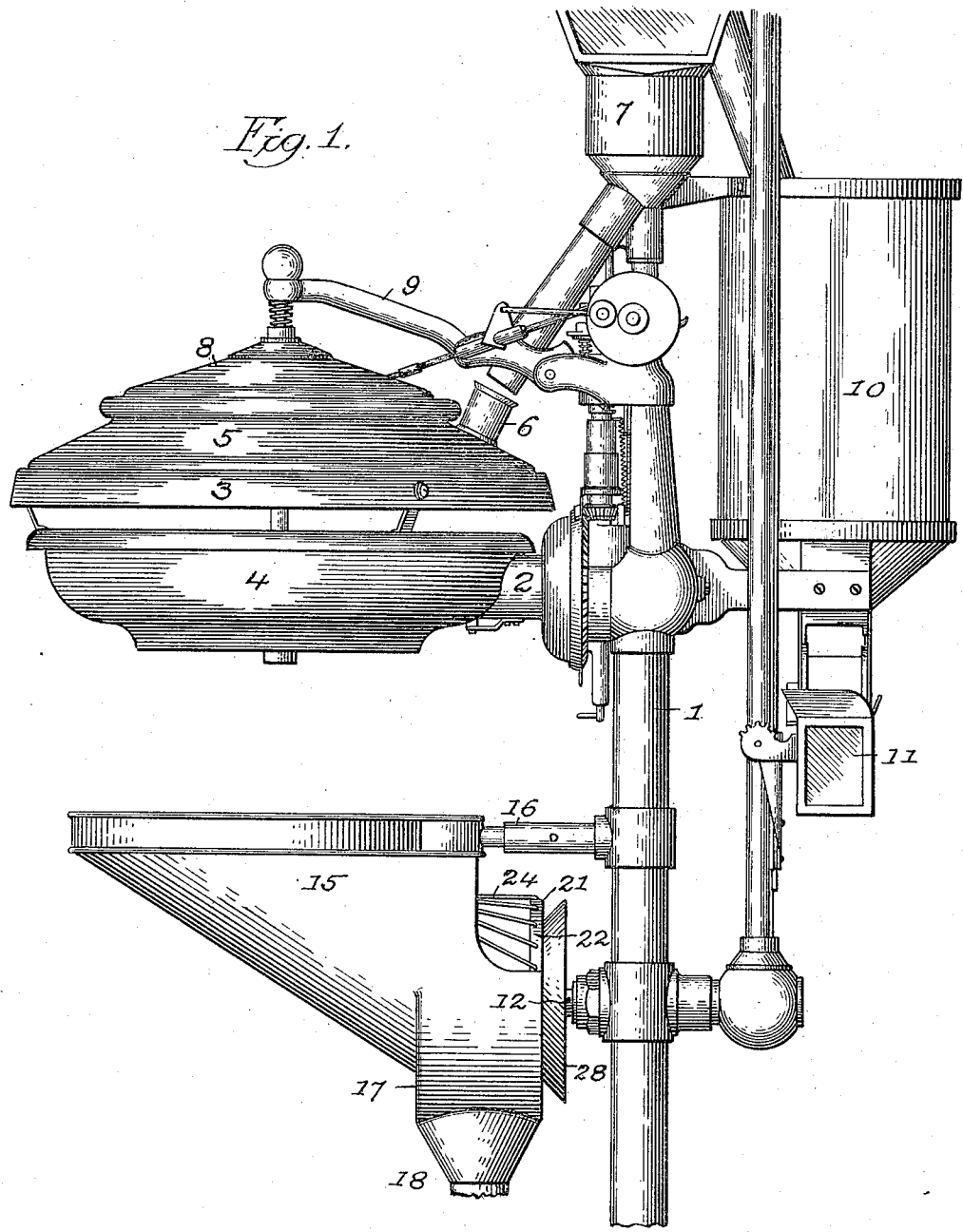
Figure 1, is a side elevation of a corn popping apparatus with the present improvement applied, and illustrating the general arrangement and association thereof with the other means and mechanisms of the apparatus.
Figure 2:
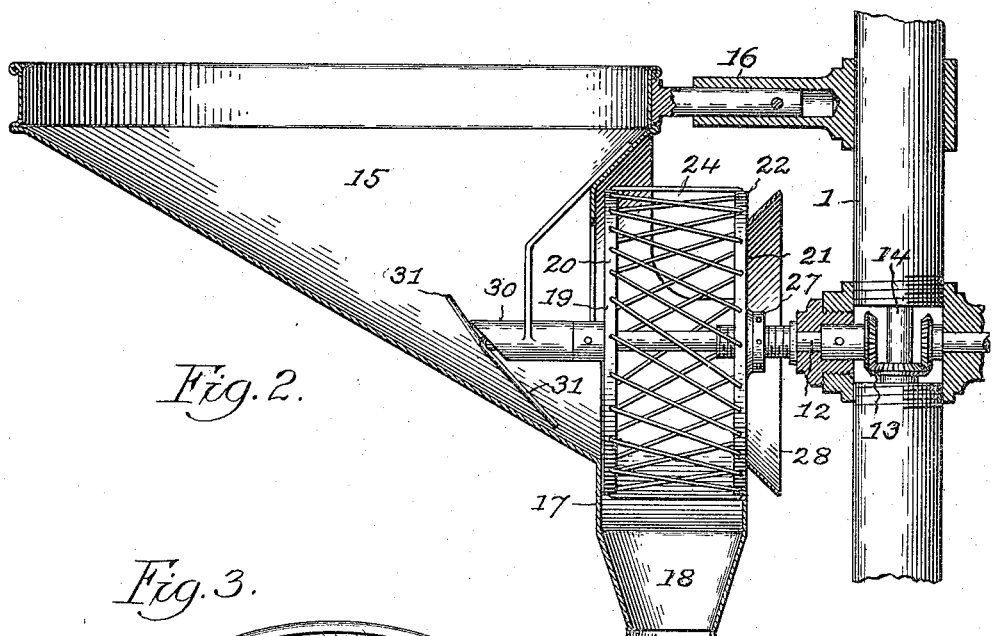
Fig. 2, is a longitudinal sectional elevation of the present grading means and the operating mechanism thereof.

Referring to the drawings, 1 designates the upright tubular standard which constitutes the supporting means of the apparatus, and having a horizontal tubular bracket 2 on which is revolubly mounted the popping pan 3 and fixedly associated heater 4, arranged to receive intermittent semi-revolutions through operating and timing mechanisms, such as described in detail in my aforesaid Patent No. 1,201,807, and in my prior application for patent, Serial No. 141,095, filed January 8, 1917. In the construction shown the fixed top member or hood 5 of the popping pan 3 has a truncated cone form and is provided with a centrally disposed discharge opening and with a laterally disposed inlet neck 6 for the passage of a supply of raw corn from an automatically charging hopper 7, preferably of the detail construction and association set forth in my aforesaid application, Serial No. 158,930. The discharge or outlet opening of the pan hood 5 has an associated cover or lid 8 pivotally mounted on the standard 1 aforesaid, by a carrying arm 9 which in turn has automatic and periodic operative connection with the driving and controlling mechanism of the apparatus, as described in detail in my aforesaid Patent No. 1,201,807 and application Serial No. 141,095.

10 designates a supply bin adapted to contain a supply of raw corn for use during an extended operation of the apparatus, and with said bin is associated an automatically operated elevator bucket 11, by which the corn is conveyed from the supply bin 10 to the charging hopper 7 aforesaid, as set forth in detail in my aforesaid application, Serial No. 158,930.

Figure 3:
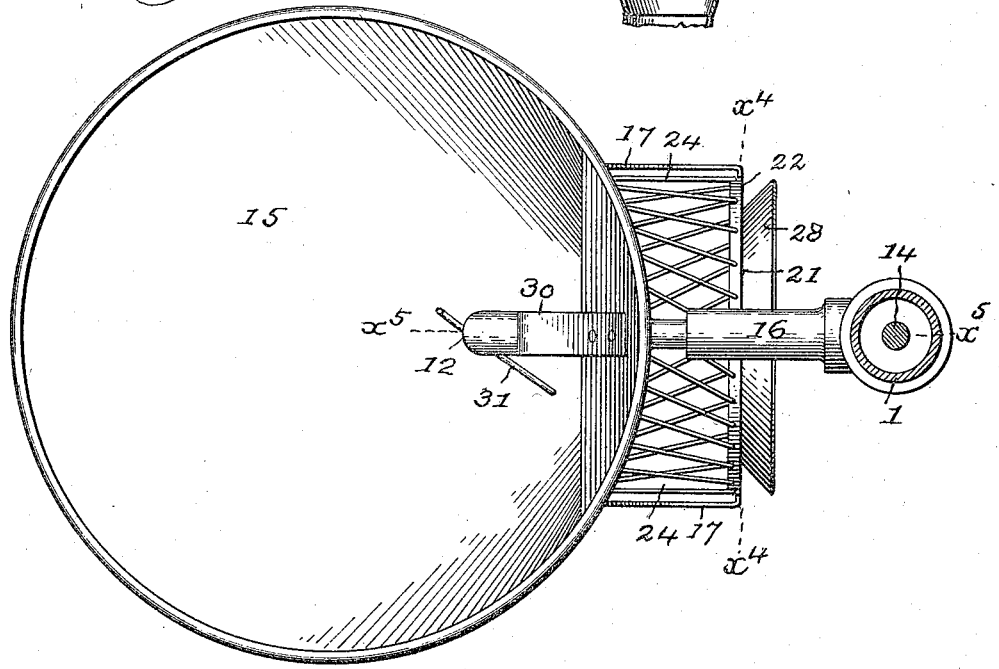
Fig. 3, is a plan view of the same.
Figure 4:
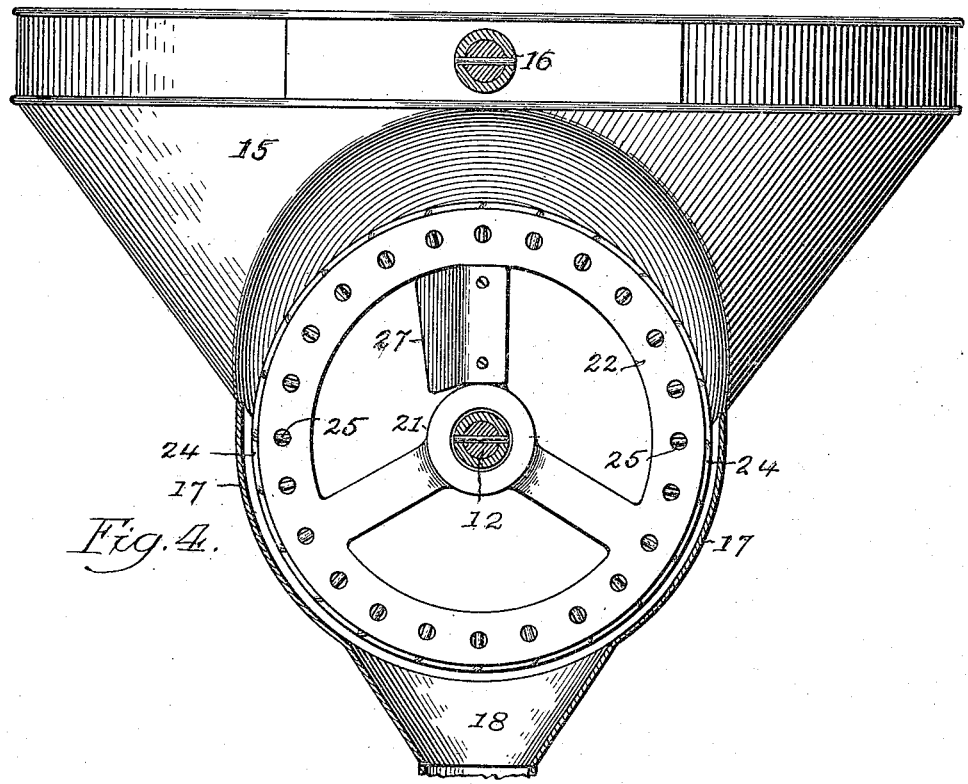
Fig. 4, is a transverse sectional elevation on line $x^4$—$x^4$, Fig. 3.

In the present improvement 12 designates a shaft section having journal bearing in the main standard 1 and having driving connection with the main shaft 14 of the apparatus, through a pair of bevel gear wheels 13 as shown in Fig. 3. Said shaft 12 constitutes the driving means of the revoluble grader drum hereinafter described.

15 designates an open top hopper or feeding chute fixedly carried on the standard 1 by a bracket support 16 of any usual form, and in a position below the popping pan 3 and heater 4, to permit of the intermittent semi-revolution of said parts in the continued operation of the apparatus. The arrangement is such, that in an inverting movement of the aforesaid popping pan 3 the contents thereof will be discharged into said hopper 15 and from the same will flow into the grading means above referred to, and to such end the bottom wall of the hopper will have a slope to one side as shown, and the sloping bottom wall will merge into a vertical wall of the grader casing now to be described.

17 designates a vertically disposed grader casing fixedly associated with the vertically disposed side of the hopper 15 above referred to, and communicating with the chamber of said hopper as shown, its lower portion being provided with an outlet opening or neck 18 for the passage away of the offal from the grader drum hereinafter described, and which extends into the interior of the grader casing through an opening in the opposite wall thereof.

The grader drum above referred to consists in detail as follows:

19 designates an open head or spider comprising an annular rim portion 20 connected to a carrying hub fixedly secured to the shaft 12 aforesaid. In an assembled condition of the parts, the inner circular face of the rim portion 20 will be on a line with the lower end of the bottom wall of the hopper 15 at its point of mergence into a vertical wall of the grader casing 17, so that the contents of said hopper may flow over such inner face of the rim 20 into the interior of the grader drum.

21 designates a counterpart open head or spider comprising an annular rim portion 22 connected by arms to a hub 23, so arranged on the shaft 12 as to be capable of a turning and a longitudinal movement in relation to said shaft for the purpose hereinafter described.

Figure 5:
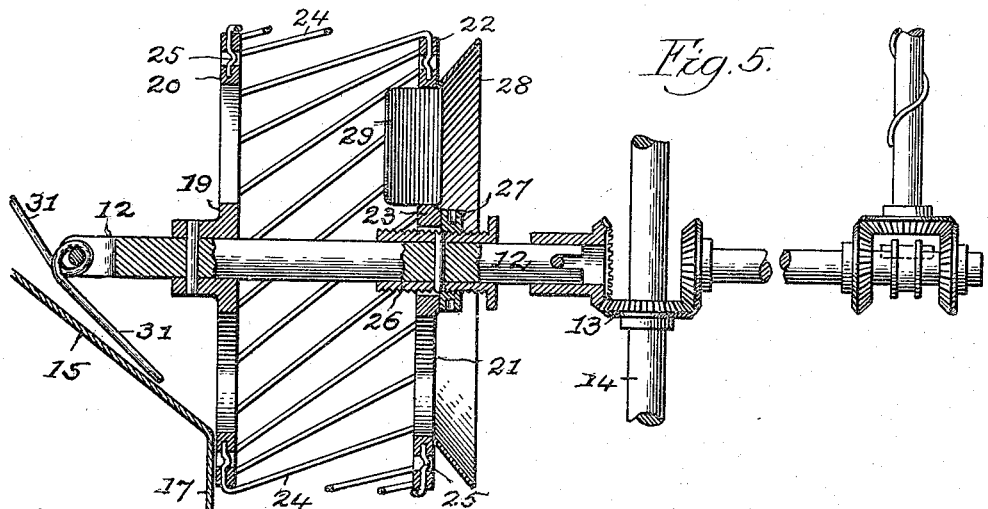
Fig. 5, is an enlarged detail longitudinal section of revoluble grader drum and accessories on line $x^5$—$x^5$, Fig. 3.

24 designates a plurality of rods or bars pivotally attached at their respective ends to the peripheries of the aforesaid annular rims 19 and 22, by angular bends on the ends of said bars fitting in a pivotal manner radial holes in said annular rims and secured against disengagement by indentations 25 in said ends engaging in recesses formed therefor in the annular rims 20, 22 aforesaid, as shown more particularly in Fig. 5. The bars or rods 24 have closely spaced parallel relation to each other and constitute a grated periphery for the cylindrical space between the annular rims 19, 22 aforesaid, through which the unpopped corn, burnt grains and fine particles of the product entering said space from the hopper 15, may pass into the grader casing 17 and through the outlet neck 18 to a suitable receptacle, while the popped corn in its natural bulk passes out through the opening of the head or spider 21, and is received on the floor of the housing of the apparatus, or by a suitable receptacle arranged therein.

A material feature of the present invention consists in an arrangement of parts whereby the spaces between the bars or rods 24 can be simultaneously increased or diminished, so as to vary the degree of the grading operation, and such adjustment is preferably attained by the heretofore described arrangement of the fixed head 19 and the longitudinal and circularly adjustable head 11, in connection with means for holding said head 21 at the desired adjustment. Said means preferably consists as follows:—

26 designates a screw-threaded sleeve or member fixedly secured to the shaft 12 aforesaid in adjacent relation to the head 21 aforesaid.

27 designates a capstan or like screw nut screwed upon the sleeve 26 and having abutting engagement against the outer end of the head 21 aforesaid, so that as said nut is adjusted toward the fixed head 29 a corresponding adjustment of the head 21 is attained, and in such adjustment the head 21 has a slight turning movement also, and the plurality of rods or bars 24 will assume an oblique relation to the longitudinal axis of the parts with a decrease in the width of the spaces between said bars or rods, and with such decrease continuing as the movable head 21 moves nearer to the fixed head 19. By the described construction, the degree of the grading operation can be readily adjusted to suit any particular condition which may arise in continued actual use of the apparatus.

Owing to the fact that the fixed drum 19 receives the driving stress from the drum shaft, the tendency is to push the movable head 21 in a direction away from said head 19, through the intermediate and obliquely arranged bars 24, and in the present structure such movement apart of the heads 19 and 21 is controlled by the screw nut 27 above described.

28 designates an annular deflector of a flaring form secured to the annular rim 22 aforesaid, and adapted to deflect the popped corn a distance away from the end of the revolving grader drum and avoid liability to a clogging of parts.

29 designates an agitator blade of any usual and suitable construction arranged in the interior of the grader drum and preferably secured to the end head 21 thereof. Said blade is adapted to maintain the contents of said drum in an agitated condition to aid in the separation of discharge of the same.

30 designates a journal bearing in the interior of the hopper 15 for an end of the shaft 12, to afford greater steadiness of parts in operation thereof.

31 designates an agitator pivoted loosely to the end of the shaft 12, in a transverse direction to the axis of said shaft and adapted in its revolution to agitate the contents of the hopper 15 adjacent to the grader drum aforesaid, and prevent accidental banking of such contents at said point.

Having thus fully described my said invention what I claim as new and desire to secure by Letters Patent, is:—

1. In a rotary grader, the combination of a carrying shaft, a fixed head and a longitudinally adjustable head arranged in separated relation on said shaft, each head comprising a skeleton center and an annular rim formed with a series of radial orifices, a series of rods having angular ends adapted for engagement in the aforesaid orifices, means for securing said rod ends in place, and means for effecting a longitudinal adjustment of the aforesaid adjustable head upon the carrying shaft, substantially as set forth.

2. In a rotary grader, the combination of a carrying shaft, a fixed head and a longitudinally adjustable head arranged in separated relation on said shaft, each head comprising a skeleton center and an annular rim formed with a series of radial orifices, a series of rods having angular ends adapted for engagement in the aforesaid orifices, means for securing said rod ends in place, the same comprising indentations in said angular ends engaging in recesses formed in the annular rims aforesaid, and means for effecting a longitudinal adjustment of the aforesaid adjustable head upon the carrying shaft, substantially as set forth.

3. In a rotary grader, the combination of a carrying shaft, a fixed head and a longitudinally adjustable head arranged in separated relation on said shaft, each head comprising a skeleton center and an annular rim formed with a series of radial orifices, a series of rods having angular ends adapted for engagement in the aforesaid orifices, means for securing said rod ends in place, and means for effecting a longitudinal adjustment of the aforesaid adjustable head upon the carrying shaft, the same comprising a screw-threaded collar fixed on the shaft and a nut having screw-threaded engagement with said collar and operative engagement with said head, substantially as set forth.

4. In a rotary grader, the combination of a grader cylinder arranged in an approximately horizontal position and having a carrying shaft, a receiving hopper inclosing the body of said grader cylinder, and an inclined feeding chute fixedly attached to a side of said hopper and inclosing one end of said cylinder, substantially as set forth.

5. In a rotary grader, the combination of a grader cylinder arranged in an approximately horizontal position and having a carrying shaft, a receiving hopper associated with said grader cylinder, an inclined feeding chute fixed to a side of said hopper and inclosing an end of said cylinder, and a loose agitator bar arranged in said chute and operatively connected to the carrying shaft of said cylinder by a slot in the end of said shaft and an intersecting pivot pin, substantially as set forth.

Signed at Chicago, Illinois, this 8th day of November, 1917.

CHARLES CRETORS.

Copies of this patent may be obtained for five cents each, by addressing the "Commissioner of Patents, Washington, D. C."